United States Patent
Chen et al.

(10) Patent No.: US 9,654,013 B2
(45) Date of Patent: May 16, 2017

(54) CONTROL CIRCUIT, CONTROL METHOD AND PRIMARY-CONTROLLED FLYBACK CONVERTER USING THE SAME

(71) Applicant: Silergy Semiconductor Technology (Hangzhou) LTD, Hangzhou, ZheJiang Province (CN)

(72) Inventors: Huiqiang Chen, Hangzhou (CN); Jianxin Wang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 59 days.

(21) Appl. No.: 14/695,337

(22) Filed: Apr. 24, 2015

(65) Prior Publication Data

US 2015/0311810 A1 Oct. 29, 2015

(30) Foreign Application Priority Data

Apr. 25, 2014 (CN) .......................... 2014 1 0170914
Apr. 16, 2015 (CN) .......................... 2015 1 0180544

(51) Int. Cl.
*H02M 3/335* (2006.01)
*H02M 1/00* (2006.01)

(52) U.S. Cl.
CPC ... *H02M 3/33515* (2013.01); *H02M 3/33523* (2013.01); *H02M 2001/0032* (2013.01); *Y02B 70/16* (2013.01); *Y02P 80/112* (2015.11)

(58) Field of Classification Search
CPC ......... H02M 3/33507; H02M 3/33515; H02M 2001/0003; Y02B 70/1433; H05B 33/0818
USPC ......... 363/21.01, 21.04, 21.08, 21.12, 21.13, 363/21.16, 21.18, 89, 79
See application file for complete search history.

(56) References Cited

U.S. PATENT DOCUMENTS

| | | | |
|---|---|---|---|
| 5,841,641 A * | 11/1998 | Faulk | H02M 3/335 363/21.14 |
| 7,295,450 B2 | 11/2007 | Berghegger | |
| 8,018,741 B2 * | 9/2011 | Huynh | H02M 3/33523 363/21.01 |
| 8,279,634 B2 * | 10/2012 | Lin | H02M 3/33569 323/283 |
| 8,310,846 B2 | 11/2012 | Piazzesi | |
| 8,406,015 B2 | 3/2013 | Lin et al. | |
| 8,582,323 B2 | 11/2013 | Berghegger et al. | |
| 8,917,527 B2 * | 12/2014 | Fang | H02M 3/33507 363/21.12 |
| 8,917,528 B2 | 12/2014 | Xu | |
| 9,124,189 B2 * | 9/2015 | Heuken | H02M 3/33523 |
| 9,209,700 B2 * | 12/2015 | Valley | H02M 3/33523 |

* cited by examiner

*Primary Examiner* — Rajnikant Patel
(74) *Attorney, Agent, or Firm* — Michael C. Stephens, Jr.

(57) ABSTRACT

In one embodiment, a control circuit configured to control a power stage circuit of a primary-controlled flyback converter, can include: (i) a current sense circuit that generates a current sense signal by sampling a primary current; (ii) a voltage sense circuit that generates a voltage sense signal by sampling an auxiliary voltage after a blanking time has elapsed; (iii) a control signal generator that generates a switch control signal according to the voltage sense signal and the current sense signal; and (iv) the switch control signal being configured to control a power switch of the power stage circuit, where the switch control signal is active during a constant on time.

13 Claims, 11 Drawing Sheets

US 9,654,013 B2

CONTROL CIRCUIT, CONTROL METHOD AND PRIMARY-CONTROLLED FLYBACK CONVERTER USING THE SAME

RELATED APPLICATIONS

This application claims the benefit of Chinese Patent Application No. 201410170914.2, filed on Apr. 25, 2014, and of Chinese Patent Application No. 201510180544.5, filed on Apr. 16, 2015, which are both incorporated herein by reference in their entirety.

FIELD OF THE INVENTION

The present invention generally relates to the field of power electronics, and more specifically to control circuits and methods, as related to a primary-controlled flyback converter.

BACKGROUND

A switched-mode power supply (SMPS), or a "switching" power supply, can efficiently convert electrical power from a source to a load, or to several different loads, with each corresponding to a different output. The main transistor of a switching-mode supply can switch between on and off states at a given operating frequency, and voltage regulation can be achieved by varying the ratio of the on-to-off time of the main transistor. Switch mode power supplies may have relatively high power conversion efficiency, as compared to other types of power converters. Switch mode power supplies may also be substantially smaller and lighter than a linear supply due to the smaller transformer size and weight.

SUMMARY

In one embodiment, a control circuit configured to control a power stage circuit of a primary-controlled flyback converter, can include: (i) a current sense circuit configured to generate a current sense signal by sampling a primary current; (ii) a voltage sense circuit configured to generate a voltage sense signal by sampling an auxiliary voltage after a blanking time has elapsed; (iii) a control signal generator configured to generate a switch control signal according to the voltage sense signal and the current sense signal, where the control signal generator generates the switch control signal under a constant on time mode when the current sense signal is greater than a current threshold after a constant on time, and where the control signal generator generates the switch control signal under a peak current mode when the current sense signal is less than the current threshold after the constant on time; and (iv) the switch control signal being configured to control a power switch of the power stage circuit, where the switch control signal is active during the constant on time.

In one embodiment, a control circuit configured to control a power stage circuit of a primary-controlled flyback converter, can include: (i) a current sense circuit configured to generate a current sense signal by sampling a primary current; (ii) a voltage sense circuit configured to generate a voltage sense signal by sampling an auxiliary voltage after a blanking time has elapsed, where the blanking time changes along with a peak of the current sense signal; (iii) a control signal generator configured to generate a switch control signal with a constant on time according to the voltage sense signal; and (iv) the switch control signal being configured to control a power switch of the power stage circuit.

In one embodiment, a method of controlling a power stage circuit of a primary-controlled flyback converter, can include: (i) generating a current sense signal by sampling a primary current; (ii) generating a voltage sense signal by sampling an auxiliary voltage after a blanking time has elapsed; (iii) controlling a power switch of the primary-controlled flyback converter according to the voltage sense signal and the current sense signal, where the controlling the power switch comprises controlling under a constant on time control mode when the current sense signal is greater than a current threshold after a constant on time, and controlling the power switch under a peak current control mode when the current sense signal is less than the current threshold after the constant on time; and (iv) maintaining the switch control signal as active during the constant on time.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims.

Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Constant on time control scheme may be used in switching mode power supplies in order to achieve a higher power factor. Because a ratio of an input current and an input voltage is in direct proportion to a ratio of a square of an on time and a time period, the input current may substantially follow the input voltage as the on time and the time period are substantially constant, in order to obtain a higher power factor. Therefore, a constant on time control scheme may be used in regulators with a power factor correction (PFC) function. For primary-controlled flyback converters, because a feedback voltage and a secondary current zero-crossing signal or a valley detection signal may be obtained by sampling a voltage across an auxiliary winding, a blanking time can be set to ensure that the voltage across the auxiliary winding is not sensed during the oscillation period.

However, because the input voltage may exhibit periodicity, or non-periodicity vibration, if the converter operates in a constant on time control state when the input voltage drops to a valley (e.g., local minimum), the peak of a current flowing through a power switch at the primary side may be reduced. Accordingly, the peak of a secondary current may also be reduced, which can lead to a shortened demagnetizing time. In some cases, an incorrect sense voltage may be obtained after the blanking time due to the shortened demagnetizing time, and this can result in a relatively large deviation on the output voltage.

Figure 1A:
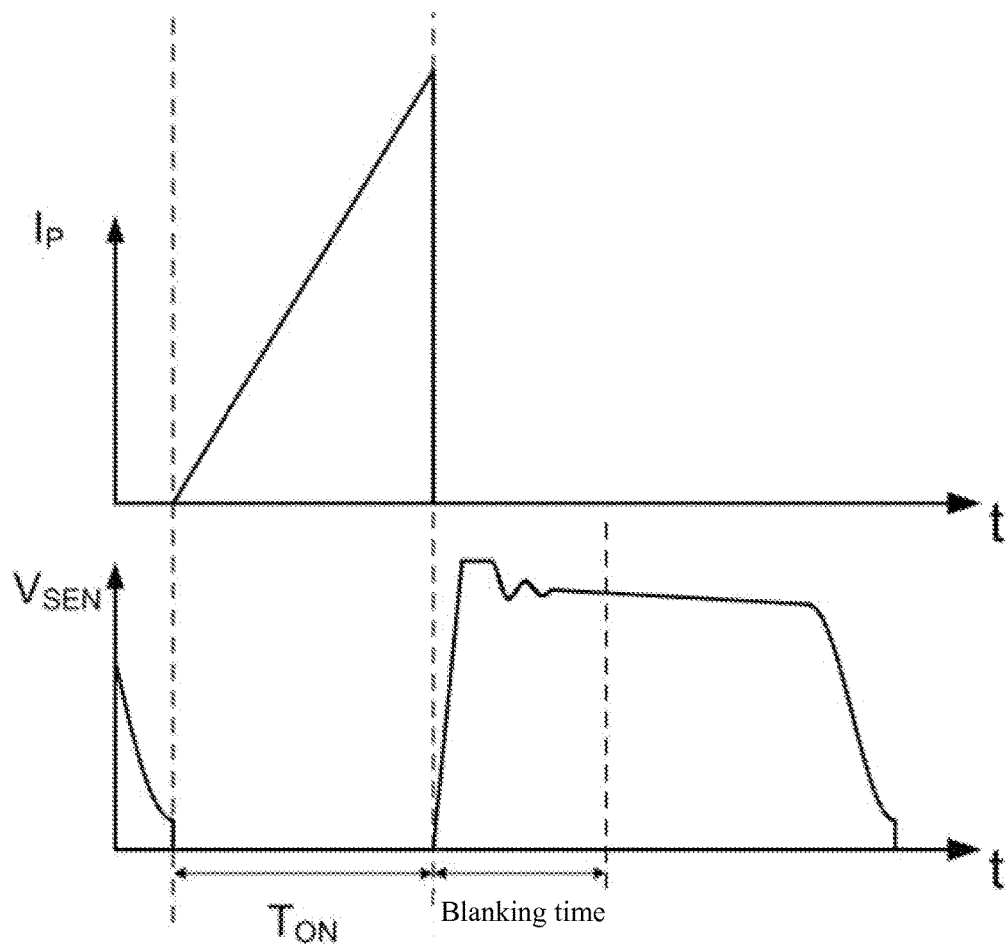
FIG. 1A is a waveform diagram of an example flyback converter when an input voltage reaches a peak value.
Figure 1B:
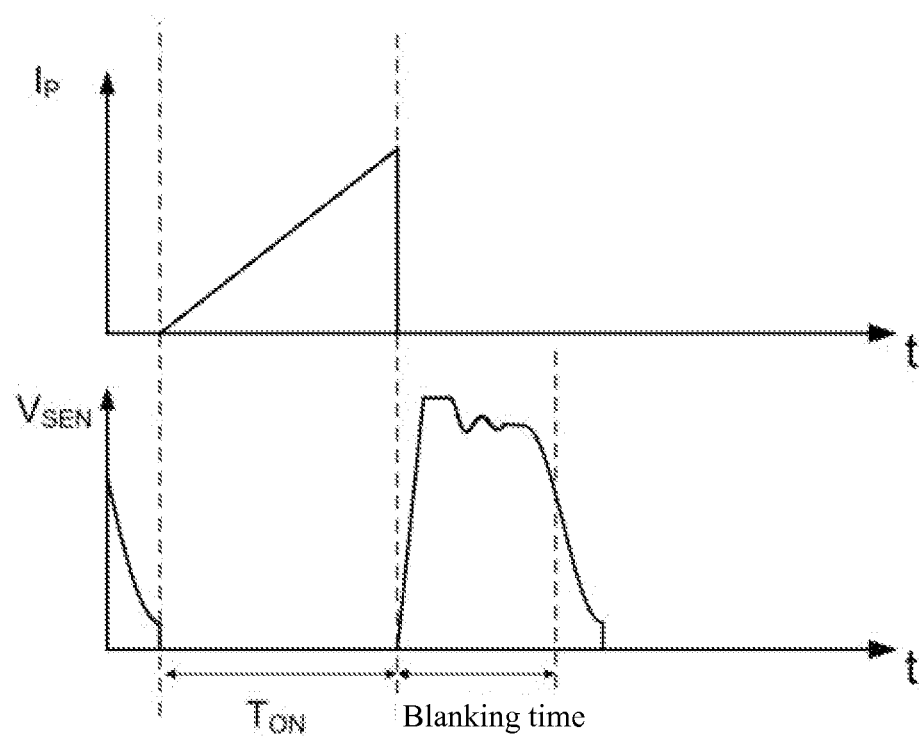
FIG. 1B is a waveform diagram of example operation of a flyback converter when the input voltage drops to a valley value.

Referring now to FIG. 1A, shown is a waveform diagram of an example flyback converter when an input voltage reaches a peak value. Also, in FIG. 1B, shown is a waveform diagram of example operation of a flyback converter when the input voltage drops to a valley value. A current detection signal (e.g., $I_P$) and a voltage detection signal (e.g., $V_{SEN}$) are shown in FIGS. 1A and 1B. As shown in FIG. 1A, when the input voltage reaches a peak value, a correct sense voltage may be obtained after the blanking time. As shown in FIG. 1B, when the input voltage drops to a valley value, the sense voltage may be significantly decreased after the blanking time, and may not accurately represent the output voltage or the secondary current.

In one embodiment, a control circuit configured to control a power stage circuit of a primary-controlled flyback converter, can include: (i) a current sense circuit configured to generate a current sense signal by sampling a primary current; (ii) a voltage sense circuit configured to generate a voltage sense signal by sampling an auxiliary voltage after a blanking time has elapsed; (iii) a control signal generator configured to generate a switch control signal according to the voltage sense signal and the current sense signal, where the control signal generator generates the switch control signal under a constant on time mode when the current sense signal is greater than a current threshold after a constant on time, and where the control signal generator generates the switch control signal under a peak current mode when the current sense signal is less than the current threshold after the constant on time; and (iv) the switch control signal being configured to control a power switch of the power stage circuit, where the switch control signal is active during the constant on time.

In one embodiment, a control circuit configured to control a power stage circuit of a primary-controlled flyback converter, can include: (i) a current sense circuit configured to generate a current sense signal by sampling a primary current; (ii) a voltage sense circuit configured to generate a voltage sense signal by sampling an auxiliary voltage after a blanking time has elapsed, where the blanking time changes along with a peak of the current sense signal; (iii) a control signal generator configured to generate a switch control signal with a constant on time according to the voltage sense signal; and (iv) the switch control signal being configured to control a power switch of the power stage circuit.

Figure 2:
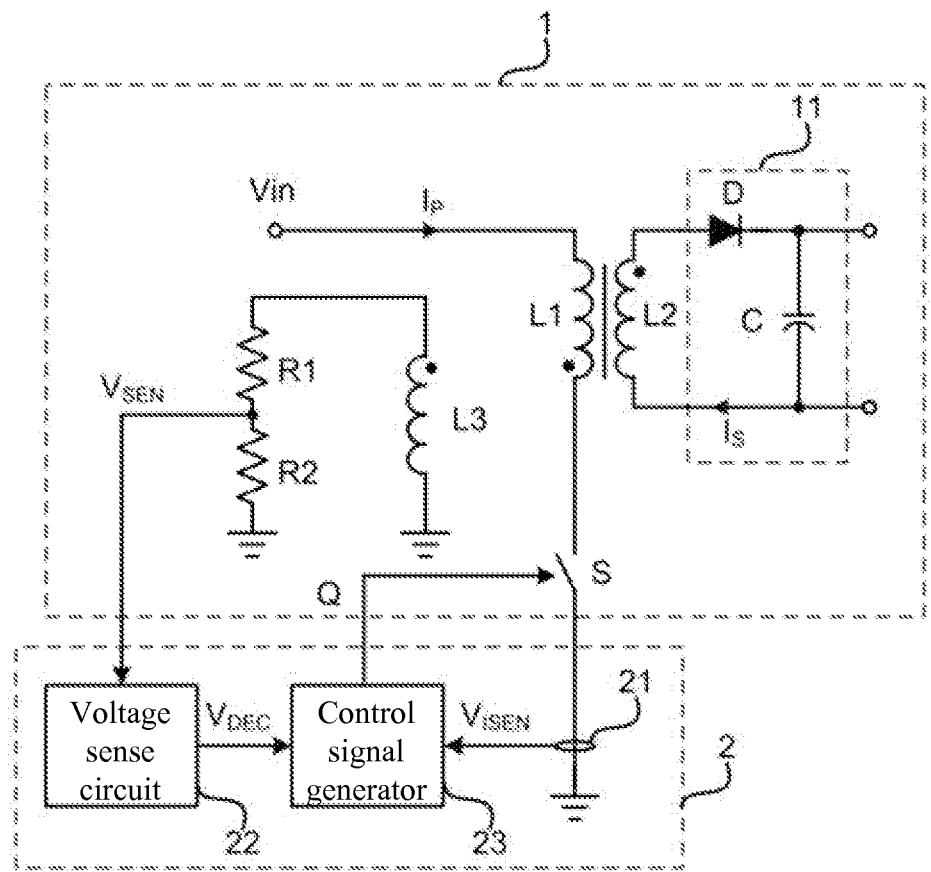
FIG. 2 is a schematic diagram of an example primary-controlled flyback converter, in accordance with embodiments of the present invention.

Referring now to FIG. 2, shown is a schematic diagram of an example primary-controlled flyback converter, in accordance with embodiments of the present invention. In this example, a primary-controlled flyback converter can include power stage circuit 1 and control circuit 2. Power stage circuit 1 can be configured as a flyback converter including primary winding L1 coupled in series between voltage input terminal Vin and ground, power switch S, secondary winding L2, and secondary rectifier 11. Power stage circuit 1 can also include auxiliary winding L3, and voltage dividing resistors R1 and R2. Auxiliary winding L3 may be coupled with primary winding L1. Output voltage information of power stage circuit 1, a zero-crossing moment, and/or a valley moment of the current through secondary winding L2, can be obtained based on a voltage across auxiliary winding L3. In this way, power switch S can be suitably controlled.

After power switch S is turned off, the voltage across auxiliary winding L3 may vibrate, which can result in an incorrect sense voltage that may not relate to the output voltage of power stage circuit 1, and thus result in inaccurate control of power switch S. In order to avoid incorrect sense voltages, a blanking time may be set in order to guarantee that the voltage is not sensed during an oscillation period. In some cases, the blanking time may be set as a constant. However, because the demagnetizing time may be relatively short, the voltage across the auxiliary winding may significantly decrease after the preset blanking time when the input voltage reaches a valley value. Thus, the zero-crossing moment or valley moment of the current through the secondary winding may not be obtained correctly.

In particular embodiments, control circuit 2 can overcome such potential problems, and may include current sense circuit 21, voltage sense circuit 22, and control signal generator 23. Current sense circuit 21 can obtain current sense signal $V_{ISEN}$ by sampling primary current $I_P$. Current sense signal $V_{ISEN}$ may be a voltage signal that represents primary current $I_P$. It is to be understood that a current signal can alternatively be used as the current sense signal. Voltage sense circuit 22 can obtain voltage sense signal $V_{DEC}$ by sampling auxiliary winding voltage $V_{SEN}$. For example, voltage sense signal $V_{DEC}$ may be used to signify a variation state of auxiliary winding voltage $V_{SEN}$ after the blanking time.

Control signal generator 23 can generate switch control signal Q according to voltage sense signal $V_{DEC}$ and current sense signal $V_{ISEN}$. Switch control signal Q may be used to control (e.g., on and off) of power switch S. When current sense signal $V_{ISEN}$ is greater than current threshold $V_{ISEN\_MIN}$ after constant on time $T_{ON}$ (e.g., the switch control signal remains active or current sense signal $V_{ISEN}$ continues to rise for constant on time $T_{ON}$), control signal generator 23 can generate switch control signal Q with a constant on time control scheme. Alternatively (e.g., when current sense signal $V_{ISEN}$ is less than current threshold $V_{ISEN\_MIN}$), control signal generator 23 can generate switch control signal Q with a peak current control scheme. Constant on time $T_{ON}$ may be an on time under a constant on time control state.

Figure 3:
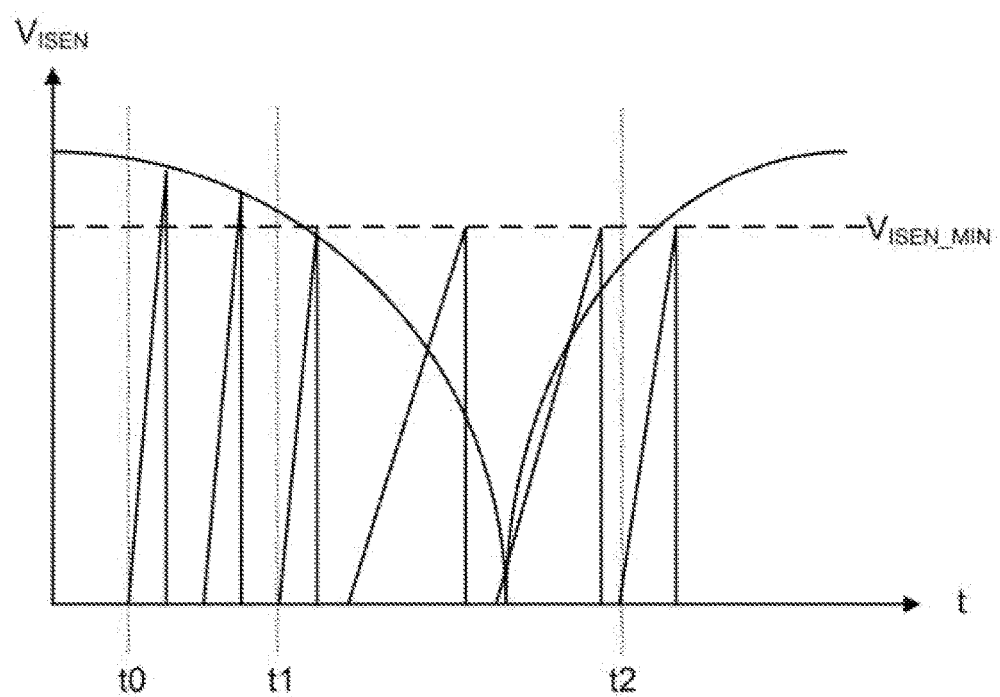
FIG. 3 is a waveform diagram of example operation of a control circuit, in accordance with embodiments of the present invention.

Referring now to FIG. 3, shown is a waveform diagram of example operation of a control circuit, in accordance with embodiments of the present invention. In this example, input voltage Vin may decrease periodically or non-periodically, such that the slope of primary current $I_P$ may also decrease as well as the peak value. During the time period t0-t1, primary current $I_P$ starts rising during constant on time $T_{ON}$ (e.g., primary current $I_P$ continues to rise when power switch S is on), and if primary current $I_P$ is greater than current threshold $V_{ISEN\_MIN}$ after constant on time $T_{ON}$, the input voltage may be not too low. Thus, switch control signal Q may be deactivated to turn off power switch S, and primary current $I_P$ may drop to zero until power switch S is turned on again.

During the time period t1-t2, if primary current $I_P$ is less than current threshold $V_{ISEN\_MIN}$ after constant on time $T_{ON}$, the current input voltage may be very low. In this case, relatively low primary current $I_P$ may result in a short demagnetizing time, and an incorrect sense voltage may be obtained. Therefore, the system can be switched to a peak current control mode in order to maintain power switch S in a conduction state until primary current $I_P$ rises to a level of current threshold $V_{ISEN\_MIN}$. Then, power switch S can be turned off and primary current $I_P$ may be zero.

In this way, the peak of primary current $I_P$ may not be less than current threshold $V_{ISEN\_MIN}$, in order to guarantee that the demagnetizing time of secondary current $I_S$ may not be less than a minimum value. As the minimum demagnetizing time may thus be substantially guaranteed, a blanking time can be set to ensure that the voltage is correctly sampled. This can avoid an incorrect sense voltage being obtained after the blanking time when the demagnetizing time changes a lot. After time t2, as the input voltage increases, the system may be switched back to a constant on time control mode.

Figure 4:
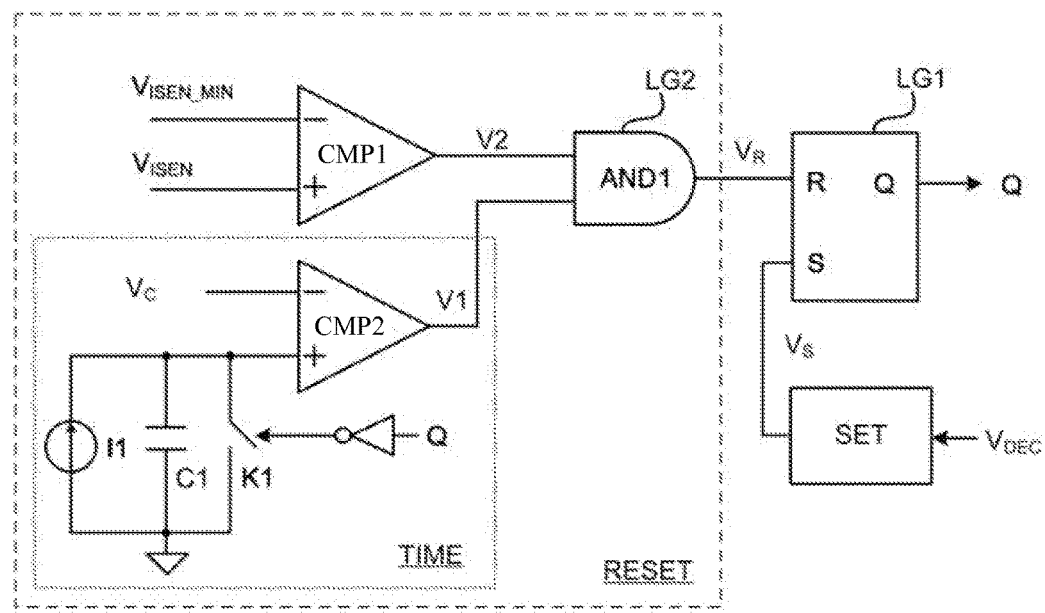
FIG. 4 is a schematic diagram of an example control signal generator, in accordance with embodiments of the present invention.

Referring now to FIG. 4, shown is a schematic diagram of an example control signal generator, in accordance with embodiments of the present invention. In this example, control signal generator 23 can include set signal generator SET, reset signal generator RESET, and logic circuit LG1. For example, set signal generator SET can detect a moment when the secondary current crosses zero, or a moment when the auxiliary voltage drops to a valley value, according to voltage sense signal $V_{DEC}$. Set signal generator SET can generate set signal $V_S$ when secondary current $I_S$ crosses zero, or when voltage sense signal $V_{DEC}$ is at a valley level. For example, set signal $V_S$ can be a voltage pulse, and may be activated at a rising or falling edge of the voltage pulse.

Reset signal generator RESET may generate reset signal $V_R$ when switch control signal Q remains active for constant on time $T_{ON}$ and current sense signal $V_{ISEN}$ rises to a level of current threshold $V_{ISEN\_MIN}$. For example, reset signal $V_R$ can be a voltage pulse, and may be activated at a rising or falling edge of the voltage pulse. Reset signal generator RESET may be configured to switch the control mode between a constant on time mode and a peak current mode. Reset signal generator RESET may detect if current sense signal $V_{ISEN}$ is greater than current threshold $V_{ISEN\_MIN}$ when power switch S remains on for constant on time $T_{ON}$. If yes, reset signal $V_R$ can be quickly activated to turn off power switch S (constant on time control mode). If not, reset signal $V_R$ may be activated when the peak of current sense signal $V_{ISEN}$ rises to a level of current threshold $V_{ISEN\_MIN}$ (peak current control mode). Therefore, the conditions for activating reset signal $V_R$ may include power switch S remaining on for at least constant on time $T_{ON}$, and current sense signal $V_{ISEN}$ rising to a level of current threshold $V_{ISEN\_MIN}$. For example, reset signal generator RESET can activate reset signal $V_R$ when both conditions are satisfied.

Reset signal generating circuit RESET can include timing circuit TIME, comparator CMP1, and logic circuit LG2. Timing circuit TIME may generate timing signal V1, which can indicate if switch control signal Q remains on for constant on time $T_{ON}$. For example, timing circuit TIME can include comparator CMP2, current source I1, charging capacitor C1, and switch K1. In this case, current source I1, charging capacitor C1, and switch K1 can be coupled in parallel between the non-inverting input terminal of comparator CMP2 and ground. The inverting input terminal of comparator CMP2 can receive a constant voltage $V_C$. Switch K1 may be controlled by a signal that is inverted relative to the switch control signal. For example, switch K1 may be turned off when power switch S is turned on, and switch K1 may be turned on when power switch S is turned off.

When switch K1 is turned off, current source I1 can charge charging capacitor C1, such that the voltage at the non-inverting input terminal of comparator CMP2 may rise with a predetermined slope. When switch K1 is turned on, charging capacitor C1 can be shorted, and the voltage at the non-inverting input terminal of comparator CMP2 may drop to zero in a relatively short time. After power switch S is turned on for constant on time $T_{ON}$, the voltage at the non-inverting input of comparator CMP2 may rise to constant voltage $V_C$, such that timing signal V1 generated by comparator CMP2 may transition to indicate that switch control signal Q is active for constant on time $T_{ON}$.

Comparator CMP1 can generate comparison result V2 by comparing current sense signal $V_{ISEN}$ against current threshold $V_{ISEN\_MIN}$. Thus, timing signal V1 generated by timing circuit TIME and comparison result V2 generated by comparator CMP1 can indicate if switch control signal Q has remained active for constant on time $T_{ON}$, or if current sense signal $V_{ISEN}$ rises to current threshold $V_{ISEN\_MIN}$. Logic circuit LG2 may generate reset signal $V_R$ according to timing signal V1 and comparison result V2. For example, timing signal V1 at a high level may indicate that switch control signal Q has remained, or remains, active for constant on time $T_{ON}$. Also, comparison result V2 at a high level may indicate that current sense signal $V_{ISEN}$ has increased, or increases, to a level of current threshold $V_{ISEN\_MIN}$. In this case, logic circuit LG2 is implemented by AND-gate AND1 with timing signal V1 and comparison result V2 input thereto. Thus, when timing signal V1 and comparison result V2 are both high, reset signal $V_R$ may transition high, and control signal generator 23 can deactivate control signal Q.

Logic circuit LG1 may set switch control signal Q to be active based on set signal $V_S$, and may set switch control signal Q to be inactive based on reset signal $V_R$. In this particular example, switch control signal Q being active can mean that switch control signal Q is used to turn on power switch S, and switch control signal Q being inactive can mean that switch control signal Q is used to turn off power switch S. As shown in this example, logic circuit LG1 may be implemented as an RS flip-flop.

In particular embodiments, a flyback converter may be primary-controlled to operate in a constant on time control mode when the input voltage is relatively large, and in a peak current mode when the input voltage is near a valley, based on the current sense signal. Thus, the primary peak current may not be too low because of the relatively low input voltage, and this can avoid an incorrect sense voltage being obtained after the blanking time due to large variations on the demagnetizing time. A blanking time that varies along with current sense signal $V_{ISEN}$ can be set to avoid possible sensing mistakes that may be caused by the preset blanking time. If current sense signal $V_{ISEN}$ is higher, the leakage inductor may be larger, and the magnetizing time may accordingly be longer. As such, the oscillation caused by leakage inductance and parasitic capacitance may be heavier after the power switch is turned off. Therefore, the blanking time may be set to change or vary along with current sense signal $V_{ISEN}$.

Figure 5:
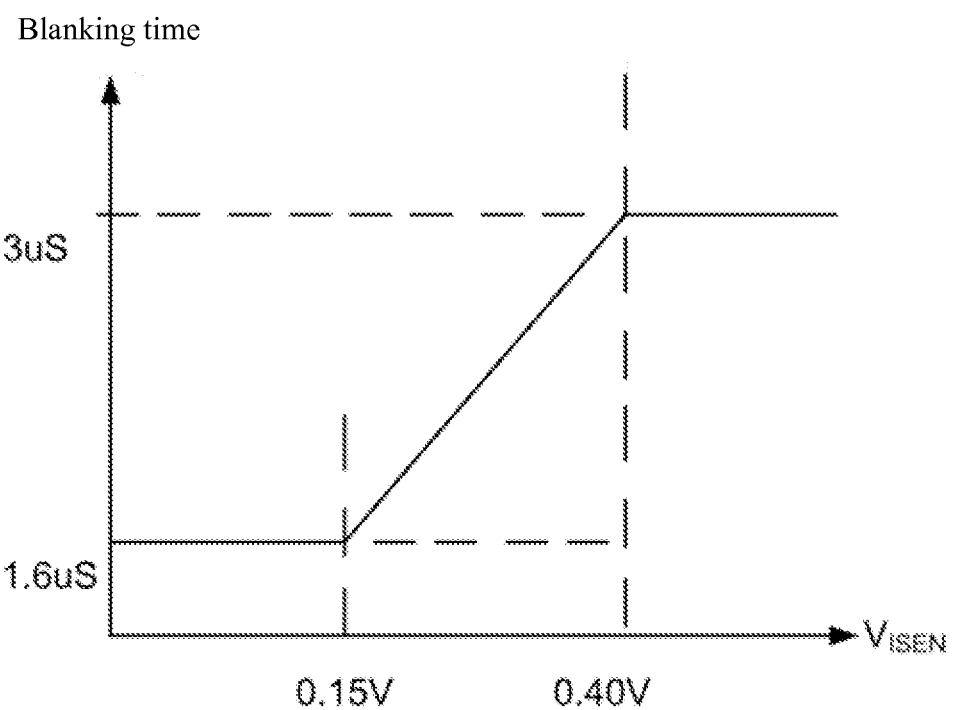
FIG. 5 is a waveform diagram of example operation indicating that a blanking time varies along with a current sense signal, in accordance with embodiments of the present invention.

Referring now to FIG. 5, shown is a waveform diagram of example operation indicating that a blanking time varies along with a current sense signal, in accordance with embodiments of the present invention. In this example, during the blanking time, the switch control signal may be inactive, but the peak of the present primary current can be obtained, so the blanking time can be controlled according to the peak of current sense signal $V_{ISEN}$. When the peak of current sense signal $V_{ISEN}$ is less than a first value (e.g., about 0.15V), the blanking time may be set as a first time (e.g., about 1.6 p). When the peak of current sense signal $V_{ISEN}$ is greater than second value (e.g., about 0.4V), the blanking time may be set as a second time (e.g., about 3 μs). When the peak of current sense signal $V_{ISEN}$ is greater than value $V_{S1}$ and less than value $V_{S2}$, the blanking time may be set as a third time that varies along with the peak of the current sense signal. For example, the third time may be a function (e.g., a linear function) of the peak of current sense signal $V_{ISEN}$ in the current switching period.

Figure 6:
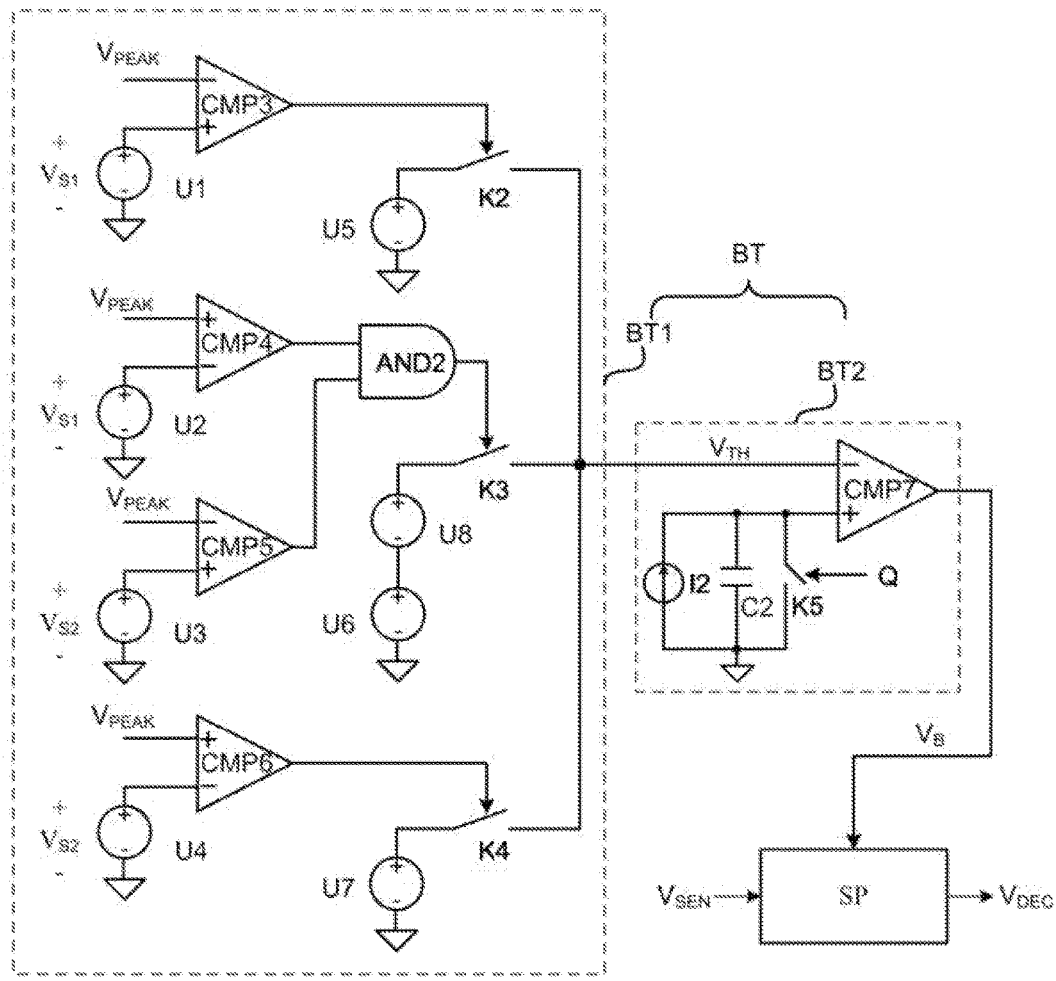
FIG. 6 is a schematic diagram of an example voltage sense circuit, in accordance with embodiments of the present invention.

Referring now to FIG. 6, shown is a schematic diagram of an example voltage sense circuit, in accordance with embodiments of the present invention. For example, voltage sense circuit 22 can include blanking circuit BT and sampling circuit SP. Blanking circuit BT may generate blanking time $V_B$ with a first time when peak $V_{PEAK}$ of current sense signal $V_{ISEN}$ is less than value $V_{S1}$ may generate blanking time $V_B$ with a second time when peak $V_{PEAK}$ of current sense signal $V_{ISEN}$ is greater than value $V_{S2}$, and may generate blanking time $V_B$ with a third time (e.g., a function of the peak) when peak $V_{PEAK}$ of current sense signal $V_{ISEN}$ is greater than value $V_{S1}$ but less than value $V_{S2}$. Sampling circuit SP may sense voltage $V_{SEN}$ according to blanking time $V_B$.

Blanking circuit BT can include blanking threshold generator BT1 and blanking timing circuit BT2. Blanking threshold generator BT1 may generate blanking threshold $V_{TH}$ according to the peak of current sense signal $V_{ISEN}$, value $V_{S1}$, and value $V_{S2}$. For example, blanking threshold generator BT1 can generate a first voltage as blanking threshold $V_{TH}$ when the peak of current sense signal $V_{ISEN}$ is less than value $V_{S1}$, may generate a second voltage as blanking threshold $V_{TH}$ when the peak of current sense signal $V_{ISEN}$ is greater than value $V_{S2}$, and may generate a value that varies along with current sense signal $V_{ISEN}$ when the peak of current sense signal $V_{ISEN}$ is greater than value $V_{S1}$ and less than value $V_{S2}$.

In this example, blanking threshold generator BT1 can include comparators CMP3-CMP6, voltage sources U1-U7, switches K2-K4, voltage controlled voltage source U8, and AND-gate AND2. Voltage source U1 can connect between the non-inverting input terminal of comparator CMP3 and ground, and a voltage of value $V_{S1}$ may be input to the non-inverting input terminal. Peak $V_{PEAK}$ of current sense signal $V_{ISEN}$ may be input to the inverting input terminal of comparator CMP3. When peak $V_{PEAK}$ of current sense signal $V_{ISEN}$ is less than value $V_{S1}$, the output of comparator CMP3 may be high to turn on switch K2. One terminal of switch K2 can connect to voltage source U5, and the other terminal can connect to the output terminal of blanking threshold generator BT1. When switch K2 is turned on, the first voltage generated by voltage source U5 at the output terminal of blanking threshold generator BT1 may be configured as the blanking threshold.

Voltage source U2 may be coupled between the inverting input terminal of comparator CMP4 and ground, and a voltage of value $V_{S1}$ may be input to the inverting input terminal. Peak $V_{PEAK}$ of current sense signal $V_{ISEN}$ may be input to the non-inverting input terminal of comparator CMP3. Also, voltage source U3 may be coupled between the non-inverting input terminal of comparator CMP5 and ground, and a voltage of value $V_{S2}$ may be input to the non-inverting input terminal. Peak $V_{PEAK}$ of current sense signal $V_{ISEN}$ may be input to the inverting input terminal of comparator CMP5. Also, the output terminals of comparators CMP4 and CMP5 can connect to the input terminal of AND-gate AND2.

When peak $V_{PEAK}$ of current sense signal $V_{ISEN}$ is greater than value $V_{S1}$ and less than value $V_{S2}$, the output of AND-gate AND2 may be high to turn on switch K3. One terminal of switch K3 can connect to voltage source U6 and voltage controlled voltage source U8, and the other terminal can connect to the output terminal of blanking threshold generator BT1. When switch K3 is turned on, the first voltage generated by voltage source U6 and voltage controlled voltage source U8 at the output terminal of blanking threshold generator BT1 may vary along with peak $V_{PEAK}$ of current sense signal $V_{ISEN}$. It is to be understood that, in the above described circuitry, the same or similar function can be achieved by exchanging input and output terminals, or by replacing AND-gate AND2 with other types of logic gates.

Voltage source U4 may be coupled between the inverting input terminal of comparator CMP6 and ground, and a voltage of value $V_{S2}$ may be input to the inverting input terminal. Peak $V_{PEAK}$ of current sense signal $V_{ISEN}$ may be input to the non-inverting input terminal of comparator CMP6. When peak $V_{PEAK}$ of current sense signal $V_{ISEN}$ is greater than value $V_{S2}$, the output of comparator CMP6 may be high to turn on switch K4. One terminal of switch K4 can connect to voltage source U7, and the other terminal can connect to the output terminal of blanking threshold generator BT1. When switch K4 is turned on, the first voltage generated by voltage source U7 at the output terminal of blanking threshold generator BT1 may be configured as the blanking threshold.

In this particular example blanking threshold generator BT1, only one of switches K2-K4 can be turned on, and the remaining of switches K2-K4 may be off, at a time. In this way, blanking threshold generator BT1 can generate a blanking threshold according to peak $V_{PEAK}$ of current sense signal $V_{ISEN}$. Blanking timing circuit BT2 may be configured to generate corresponding blanking signal $V_B$ according to blanking threshold $V_{TH}$. For example, blanking timing circuit BT2 can include comparator CMP7, current source I2, charging capacitor C2, and switch K5. Current source I2, charging capacitor C2, and switch K5 may be coupled in parallel between the non-inverting input terminal of comparator CMP7 and ground.

Blanking threshold $V_{TH}$ may be input to the inverting input terminal of comparator CMP7. Switch K5 may be controlled via switch control signal Q such that switch K5 is turned off when power switch S is off, and switch K5 is turned on when power switch S is on. When switch K5 is turned off, current source 12 can charge charging capacitor C2 such that the voltage at the non-inverting input terminal of comparator CMP7 may rise with a predetermined slope. When switch K5 is turned on, charging capacitor C2 may be shorted out and discharged, and the voltage at the non-inverting input terminal of comparator CMP7 can drop to zero in a relatively short time. Therefore, when power switch S is turned off, the voltage at the non-inverting input terminal of comparator CMP7 can increase to a level of blanking threshold $V_{TH}$, and blanking signal $V_B$ output by comparator CMP7 may transition. In this fashion, the blanking time may vary along with blanking threshold $V_{TH}$.

Therefore, by setting a blanking time that changes along with current sense signal $V_{ISEN}$, the sampling time can also change as the auxiliary voltage oscillates, in order to enhance circuit performance. In addition, the example voltage sense circuit shown in FIG. 6 can also be employed to the control circuit under a constant on time control mode. For example, the control circuit can include a current sense circuit, a voltage sense circuit as discussed above, and a control signal generator which can generate a switch control signal under the constant on time control mode. As the blanking time changes along with current sense signal $V_{ISEN}$, sense mistakes can also be avoided when the control signal generator operates in a constant on time control mode.

In one embodiment, a method of controlling a power stage circuit of a primary-controlled flyback converter, can include: (i) generating a current sense signal by sampling a primary current; (ii) generating a voltage sense signal by sampling an auxiliary voltage after a blanking time has elapsed; (iii) controlling a power switch of the primary-controlled flyback converter according to the voltage sense signal and the current sense signal, where the controlling the power switch comprises controlling under a constant on time control mode when the current sense signal is greater than a current threshold after a constant on time, and controlling the power switch under a peak current control mode when the current sense signal is less than the current threshold after the constant on time; and (iv) maintaining the switch control signal as active during the constant on time.

Figure 7:
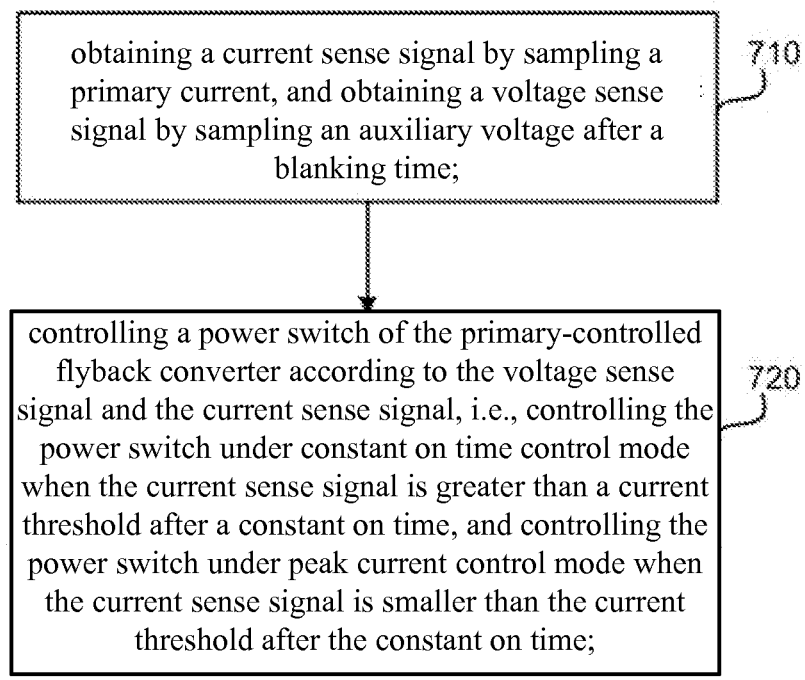
FIG. 7 is a flow diagram of an example control method, in accordance with embodiments of the present invention.

Referring now to FIG. 7, shown is a flow diagram of an example control method, in accordance with embodiments of the present invention. In this example, at 710, a current sense signal (e.g., $V_{ISEN}$) can be obtained by sampling (e.g., via current sense circuit 21) a primary current (e.g., $I_P$). Also, a voltage sense signal (e.g., $V_{SEN}$) by sampling (e.g., via voltage sense circuit 22) an auxiliary voltage after a blanking time. At 720, a power switch (e.g., S) of a primary-controlled flyback converter can be controlled according to the voltage current sense signals. The power switch can be controlled with a constant on time control scheme/mode when the current sense signal is greater than a current threshold after a constant on time, and the power switch can be controlled with a peak current control scheme/mode when the current sense signal is less than the current threshold after the constant on time.

During the constant on time, the switch control signal (e.g., Q) can remain active. For example, at 720, the power switch of the primary-controlled flyback converter being controlled according to the voltage and current sense signals can include: turning on the power switch when the secondary current crosses zero or when the voltage sense signal drops to the valley value; and turning off the power switch when the switch control signal remains active for the constant on time and the current sense signal reaches a level of the current threshold.

The flyback converter may be primary-controlled to operate in a constant on time control mode when the input voltage is relatively large, and in peak current mode when the input voltage is near a valley, based on the current sense signal. Thus, the primary peak current may not be too low because of the relatively low input voltage. This can avoid obtaining a possibly incorrect sense voltage after the blanking time, due to a relatively large variation on the demagnetizing time. In particular embodiments, the blanking time may change along with the peak of the current sense signal. Therefore, by setting a blanking time that changes along with current sense signal $V_{ISEN}$, the sampling time can also change as the auxiliary voltage oscillates, in order to enhance circuit performance.

In a flyback converter with a PFC function, a sampling circuit can be coupled to a load for obtaining a sense signal by sampling an output voltage, and to regulate an opto-coupler by comparing the sense signal against a reference voltage. For example, an opto-coupler may be used for isolation, and for controlling a pulse-width modulation (PWM) signal, in order to control a main power switch. However, in certain embodiments, an auxiliary winding and one or more sampling resistors can be employed to sense the output voltage, and the sense voltage signal can be provided to a control circuit for controlling the main power switch. In some cases, the peak of a primary inductor current in one power frequency may change a lot, and when the peak is relatively low and the main power switch is off, oscillation caused by the primary inductor and the parasitic capacitor of the main power switch may be relatively small, possibly leading to short demagnetizing time, whereby the output voltage may not be effectively detected at the valley.

In particular embodiments, a primary-controlled PFC control circuit with a substantially constant output voltage for a flyback converter, can regulate an on time of a main power switch in the flyback converter according to a sense voltage signal. The sense voltage signal can be generated from an output voltage, in order to further output a substantially constant output voltage. For example, the control circuit can include a primary current feedback circuit, a valley detection circuit, and an output voltage feedback circuit.

The primary current feedback circuit can sample a primary current, and when the primary current is greater than a reference current, the main power switch may be controlled to operate under a constant on time mode. When the primary current is less than the reference current, the main power switch can be controlled operate under a peak current mode. The output voltage feedback circuit can generate a sense voltage signal by sampling an output voltage of the flyback converter, and may generate a voltage feedback signal by comparing the sense voltage signal against a reference voltage. An on time of the main power switch can be regulated according to the voltage feedback signal under a constant on time mode.

The valley detection circuit can detect a valley value of the sense voltage signal, and may control the main power switch to be turned on substantially at the valley value. Also in certain embodiments, a primary-controlled PFC control method for generating constant output voltage for a flyback converter, can regulate the on time of a main power switch in the flyback converter according to a sense voltage signal obtained from an output voltage of the flyback converter, so as to obtain a substantially constant output voltage. The method can include sampling a primary current, and when the primary current is greater than a reference current, controlling the main power switch to operate under the constant on time mode. When the primary current is less than the reference current, the main power switch can be controlled to operate in a peak current mode. The method can also include generating a sense voltage signal by sampling the output voltage of the flyback converter, and generating a voltage feedback signal by comparing the sense voltage signal against a reference voltage. Also, the on time of the main power switch can be regulated under a constant on time mode according to the voltage feedback signal. The method can also include detecting the valley value of the sense voltage signal, and controlling the main power switch to be turned on substantially at the valley value.

Figure 8:
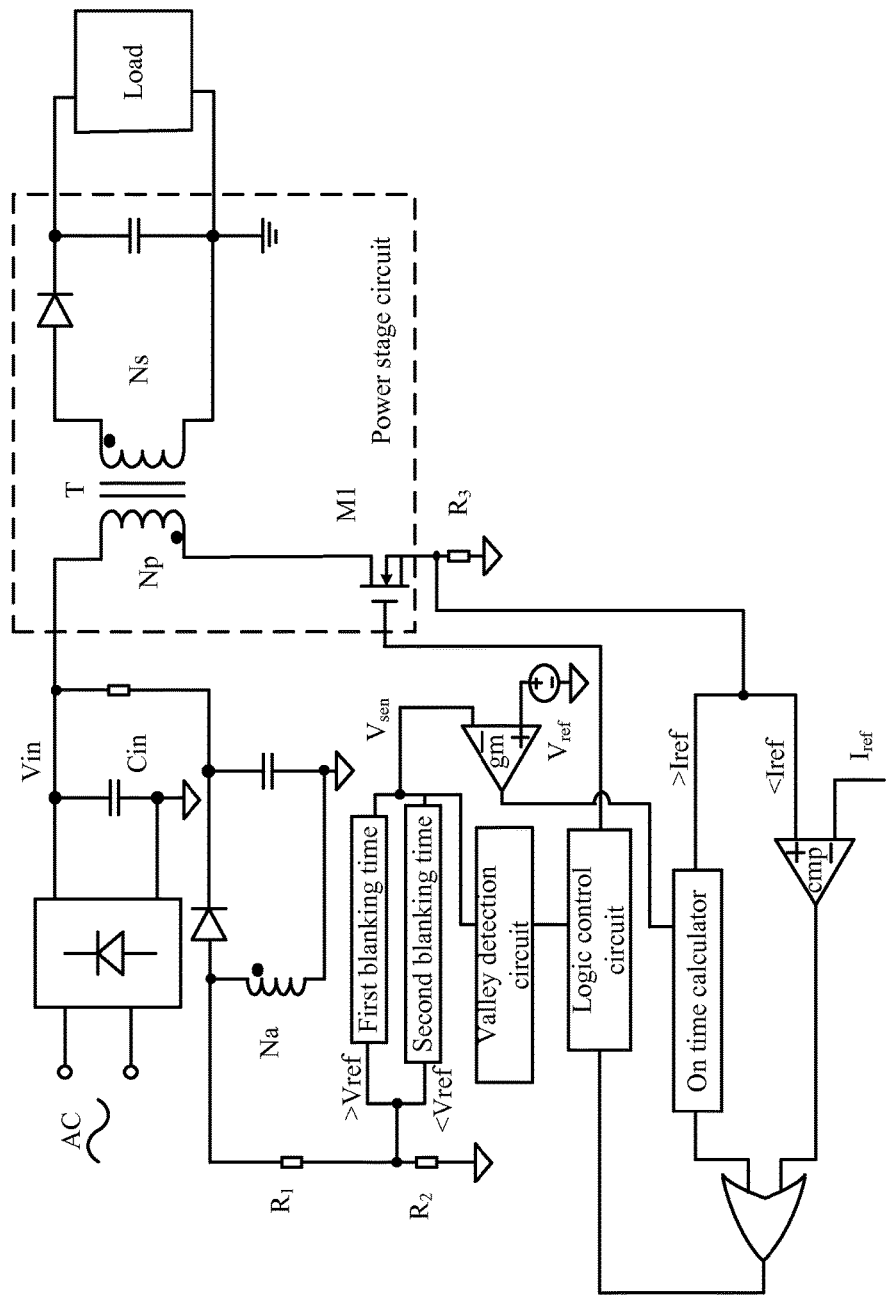
FIG. 8 is a schematic block diagram of a first example primary-controlled PFC control circuit with a constant output voltage, in accordance with embodiments of the present invention.

Referring now to FIG. 8, shown is a schematic block diagram of a first example primary-controlled PFC control circuit with a constant output voltage, in accordance with embodiments of the present invention. This example flyback converter can include a rectifier and a power stage circuit. The power stage circuit can include main power switch M1 and transformer T, which can include primary winding Np and secondary winding Ns. Also, auxiliary winding Na can be coupled with secondary winding Ns for obtaining a signal that represents the output voltage of the flyback converter. In addition, series-coupled sampling resistors $R_1$ and $R_2$ with a common node can be connected to the auxiliary winding.

The output voltage feedback circuit can sense the voltage at the common node, as oscillation may be caused by the primary winding and parasitic capacitor of the main power switch. The demagnetizing time may be longer and the output voltage will be larger along with the oscillation being larger. Similarly, the demagnetizing time may be shorter and the output voltage smaller as the oscillation is smaller. If sense voltage signal $V_{sen}$ is detected to be greater than a reference voltage, the oscillation can be indicated as very large, and the demagnetizing time may thus be longer. In order to detect the output voltage and the valley value thereof, a first blanking time may be set during which valley value detection may not be detected, and the valley value detection can be taken after the first blanking time (e.g., about 2 μs). In this way, the sense voltage signal can accurately represent the output voltage, and the valley detection circuit can input the valley value signal to the logic control circuit, such that the main power switch can be turned on. When the sense voltage signal is less than the reference voltage, a second blanking time that is less than a first blanking time may be set.

Error amplifier "gm" can compare the sense voltage signal against reference voltage $V_{ref}$, in to obtain a voltage feedback signal. The voltage feedback signal may be provided to an on time calculator for regulating the on time, and for generating a constant output voltage. When oscillation caused by the primary winding and the parasitic capacitor of the main power switch is relatively small, the demagnetizing time may be relatively short, so the valley value of the sense voltage signal may not be detected. The primary current feedback circuit may be used to sample the primary current (e.g., at the source of main power switch M1). If the primary current is greater than a reference current, the main power switch may be controlled to operate under a constant on time mode, and after the preset on time, the logic control circuit can turn the main power switch off.

When the primary current is less than the reference current, the main power switch may be controlled to operate under a peak current mode. The peak current may be compared to reference current Iref by comparator cmp1, and when the peak current reaches a level of the reference current, the main power switch may be turned off. Thus, the demagnetizing time may be longer, and there can be sufficient time for the valley detection circuit to detect the valley value of the sense voltage signal. The primary current feedback signals generated under two operation modes can be provided to the input terminals of an OR-gate, and the output terminal of the OR-gate can connect to the logic control circuit.

Figure 9:
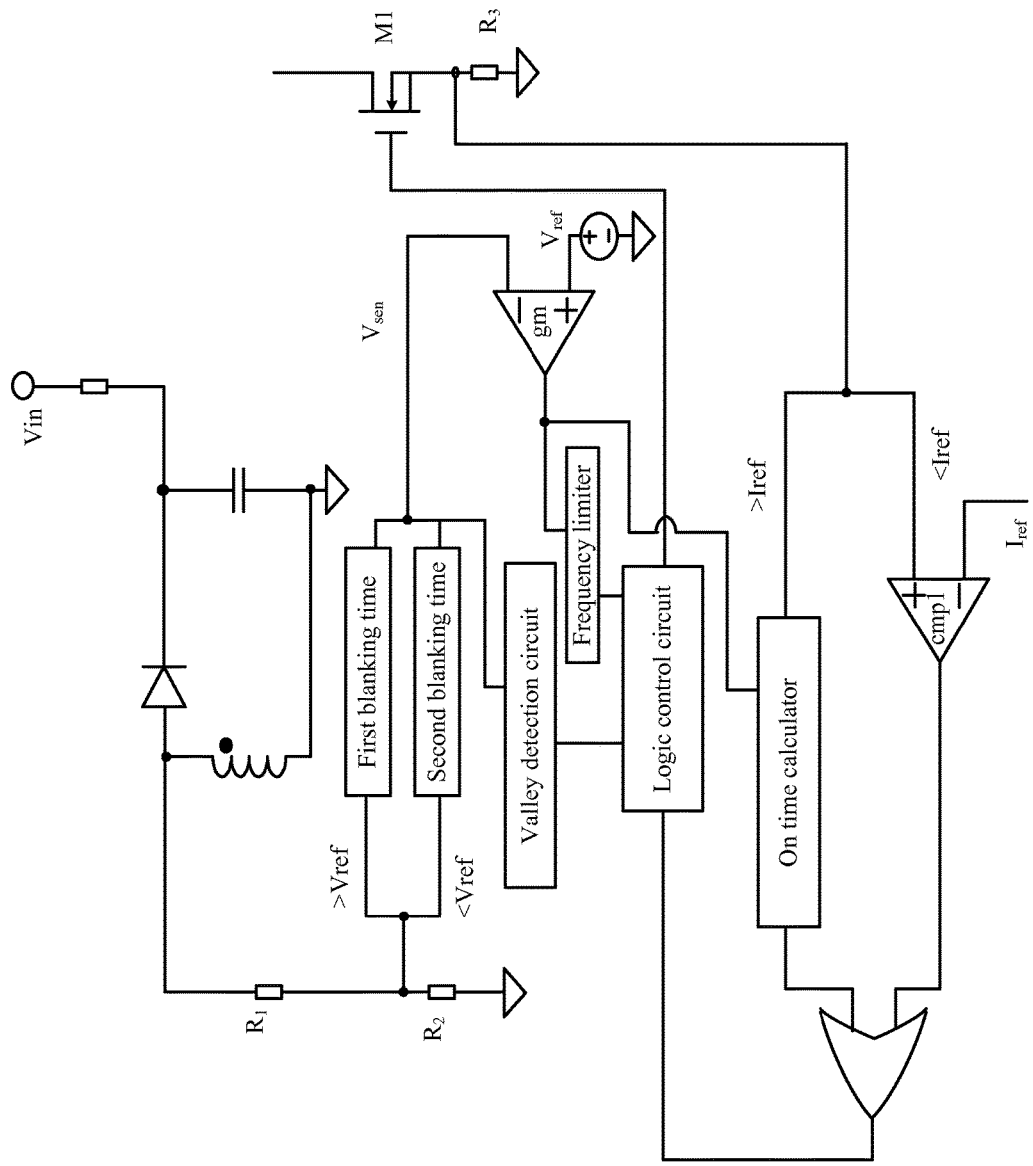
FIG. 9 is a schematic block diagram of a second example primary-controlled PFC control circuit with a constant output voltage, in accordance with embodiments of the present invention.

Referring now to FIG. 9, shown is a schematic block diagram of a second example primary-controlled PFC control circuit with constant output voltage, in accordance with embodiments of the present invention. In this example, a frequency limiter may be included, in order to limit the switching frequency of the main power switch to a certain range. The on time of the main power switch may be reduced or the switching frequency can be reduced by the frequency limiter according to the voltage feedback signal under a light load mode, in order to lower the output power. When the switching frequency is reduced by the frequency limiter, the valley detection may not be taken.

Figure 10:
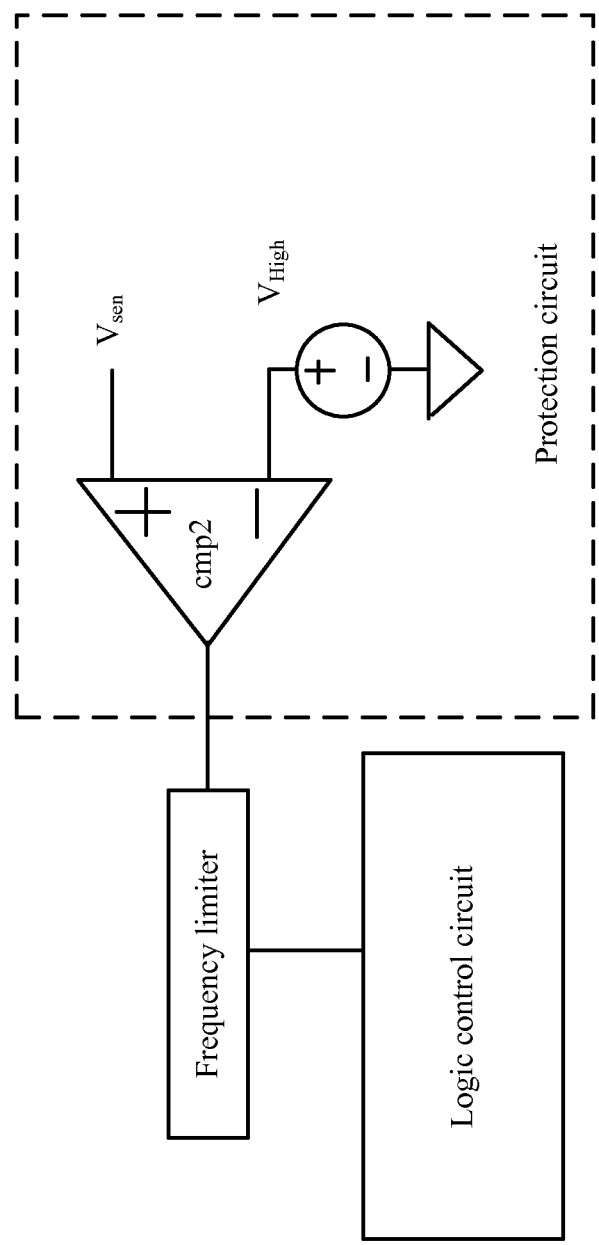
FIG. 10 is a schematic block diagram of an example protection circuit under a light-load mode, in accordance with embodiments of the present invention.

Referring now to FIG. 10, shown is a schematic block diagram of an example protection circuit under a light-load mode, in accordance with embodiments of the present invention. When the circuit is activated under the light load mode, the output voltage may overshoot, so the sense voltage signal may be too high. Thus, a threshold voltage $V_{High}$ of the sense voltage signal may be set for comparing against sense voltage signal $V_{sen}$ by comparator cmp2. When the output voltage is greater than the threshold voltage, the frequency limiter may limit the switching frequency of the main power switch to be at a lowest switching frequency until sense voltage signal $V_{sen}$ is less than the threshold voltage, and valley detection may not occur during this state. For example, the logic control circuit can include an RS flip-flop where the primary current feedback signal is coupled to the reset terminal of the RS flip-flop. The valley value of the valley detection circuit and the frequency limiter may be coupled to the set terminal. The output terminal of the RS flip-flop can be coupled to the control terminal of the main power switch.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A control circuit configured to control a power stage circuit of a primary-controlled flyback converter, the control circuit comprising:
   a) a current sense circuit configured to generate a current sense signal by sampling a primary current;
   b) a voltage sense circuit configured to generate a voltage sense signal by sampling an auxiliary voltage after a blanking time has elapsed, wherein said blanking time changes along with a peak of said current sense signal;
   c) a control signal generator configured to generate a switch control signal according to said voltage sense signal and said current sense signal, wherein said control signal generator generates said switch control signal under a constant on time mode when said current sense signal is greater than a current threshold after a constant on time, and wherein said control signal generator generates said switch control signal under a peak current mode when said current sense signal is less than said current threshold after said constant on time; and d) said switch control signal being configured to control a power switch of said power stage circuit, wherein said switch control signal is active during said constant on time.

2. The control circuit of claim 1, wherein said control signal generator comprises:
   a) a set signal generator configured to activate a set signal when at least one of: a secondary current crosses zero, and said voltage sense signal drops to a valley value;
   b) a reset signal generator configured to activate a reset signal when said switch control signal remains active for said constant on time and said current sense signal rises to a level of said current threshold; and
   c) a logic circuit configured to activate said switch control signal in response to said set signal being activated, and to deactivate said switch control signal in response to said reset signal being activated.

3. The control circuit of claim 2, wherein said reset signal generator comprises:
   a) a timing circuit configured to generate a timing signal that indicates whether said switch control signal has remained active for said constant on time;
   b) a comparator configured to generate a comparison result according to said current sense signal and said current threshold; and
   c) a reset logic circuit configured to generate said reset signal according to said timing signal and said comparison result.

4. The control circuit of claim 1, wherein said blanking time is a linear function of said peak of said current sense signal when said peak is greater than a first value and less than a second value.

5. The control circuit of claim 4, wherein said voltage sense circuit comprises:
   a) a blanking circuit configured to generate said blanking time as a first constant time when said peak of said current sense signal is less than said first value, and to generate said blanking time with as a second constant time when said peak of said current sense signal is greater than said second value; and
   b) a sampling circuit configured to sample a voltage according to said blanking time.

6. The control circuit of claim 5, wherein said blanking circuit comprises:
   a) a blanking threshold generator configured to generate a blanking threshold according to said peak of said current sense signal, said first value, and said second value; and
   b) a blanking timing circuit configured to generate said blanking signal according to said blanking threshold.

7. A control circuit configured to control a power stage circuit of a primary-controlled flyback converter, the control circuit comprising:
   a) a current sense circuit configured to generate a current sense signal by sampling a primary current;
   b) a voltage sense circuit configured to generate a voltage sense signal by sampling an auxiliary voltage after a blanking time has elapsed, wherein said blanking time is a linear function of a peak of said current sense signal when said peak is greater than a first value and less than a second value;

c) a control signal generator configured to generate a switch control signal with a constant on time according to said voltage sense signal; and
   d) said switch control signal being configured to control a power switch of said power stage circuit.

8. The control circuit of claim 7, wherein said voltage sense circuit comprises:
   a) a blanking circuit configured to generate said blanking time as a first constant time when said peak of said current sense signal is less than said first value, and to generate said blanking time as a second constant time when said peak of said current sense signal is greater than said second value; and
   b) a sampling circuit configured to sample a voltage according to said blanking time.

9. The control circuit of claim 8, wherein said blanking circuit comprises:
   a) a blanking threshold generator configured to generate a blanking threshold according to said peak of said current sense signal, said first value, and said second value; and
   b) a blanking timing circuit configured to generate a blanking signal according to said blanking threshold.

10. A primary-controlled flyback converter, comprising:
    a) a power stage circuit; and
    b) the control circuit of claim 1.

11. A method of controlling a power stage circuit of a primary-controlled flyback converter, the method comprising:
    a) generating a current sense signal by sampling a primary current;
    b) generating a voltage sense signal by sampling an auxiliary voltage after a blanking time has elapsed, wherein said blanking time changes along with a peak of said current sense signal;
    c) controlling a power switch of said primary-controlled flyback converter according to said voltage sense signal and said current sense signal, wherein said controlling said power switch comprises controlling under a constant on time control mode when said current sense signal is greater than a current threshold after a constant on time, and controlling said power switch under a peak current control mode when said current sense signal is less than said current threshold after said constant on time; and
    d) maintaining said switch control signal as active during said constant on time.

12. The method of claim 11, wherein said controlling said power switch comprises:
    a) turning on said power switch when at least one of: said secondary current crosses zero, and said voltage sense signal drops to a valley value; and
    b) turning off said power switch when said switch control signal remains active for said constant on time and said current sense signal reaches a level of said current threshold.

13. The method of claim 11, wherein said blanking time is a linear function of said peak of said current sense signal when said peak is greater than a first value and less than a second value.

* * * * *